Figure 1:
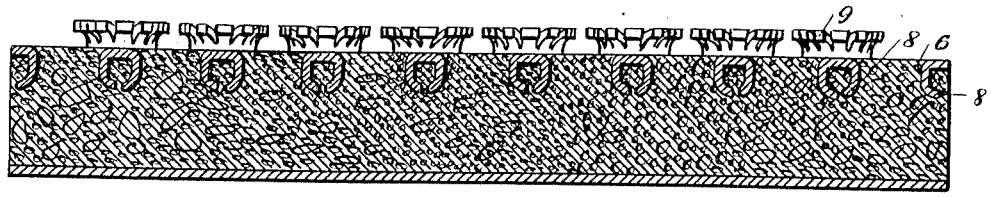

W. APPLEBY.
REINFORCED CONCRETE CONSTRUCTION.
APPLICATION FILED DEC. 13, 1912.

1,102,122. Patented June 30, 1914.

WITNESSES
Frank C. Palmer
P. B. Marshall

INVENTOR
William Appleby
BY
Munn & Co.
ATTORNEYS

UNITED STATES PATENT OFFICE.

WILLIAM APPLEBY, OF NAPA, CALIFORNIA.

REINFORCED CONCRETE CONSTRUCTION.

1,102,122.  Specification of Letters Patent.  Patented June 30, 1914.

Application filed December 13, 1913. Serial No. 806,478.

*To all whom it may concern:*

Be it known that I, WILLIAM APPLEBY, a citizen of the United States, and a resident of Napa, in the county of Napa and State of California, have invented a new and Improved Reinforced Concrete Construction, of which the following is a full, clear, and exact description.

My invention has for its object to provide a reinforcing plate with teeth projecting from the plate around holes therein, the teeth at each hole being bent laterally, substantially to the planes extending from the plate at the adjacent holes and parallel with the axes of the holes. The teeth which extend from one side of the plate are bent laterally in the general direction of the adjacent holes at the sides of which the teeth extend from the other side of the plate. With this construction the cement will be held by the teeth at one side of the plate and will be directly united by the cement in the hole with the cement at the other side of the plate held by the teeth around the adjacent holes.

Still other objects of the invention will appear in the following specification in which the preferred form of my invention will be found described.

In the drawings similar reference characters refer to similar parts in all of the views in which—

Figure 2:
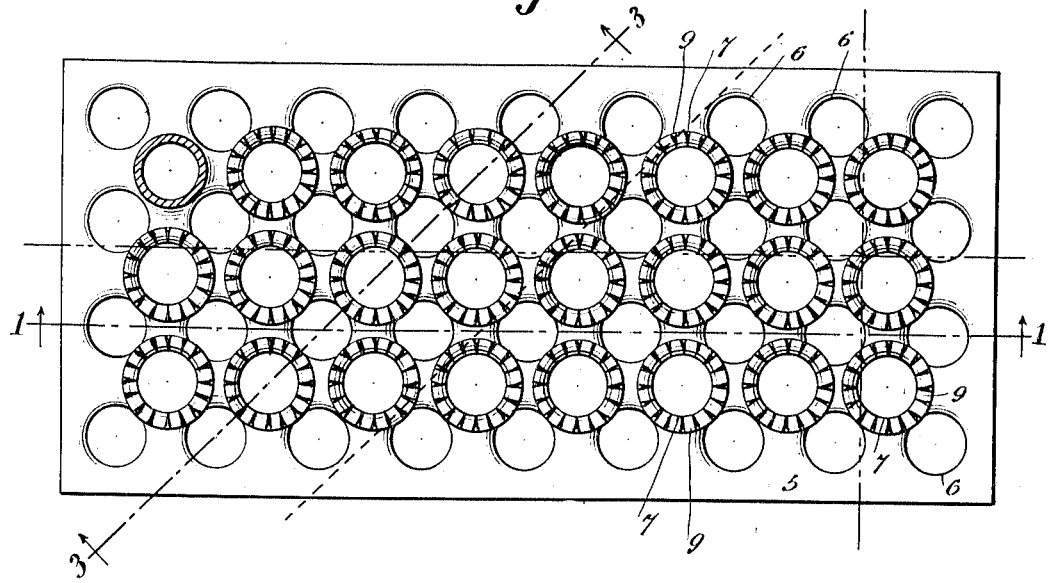
Figure 3:
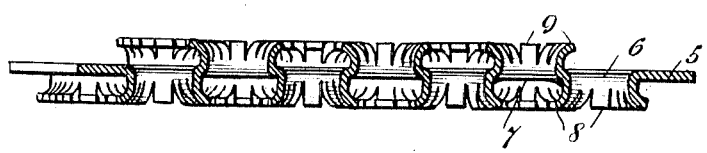

Figure 1 is a sectional view on the line 1—1 of Fig. 2; Fig. 2 is a plan view of Fig. 1 with the teeth around one of the holes removed to show the construction; and Fig. 3 is a sectional view on the line 3—3 of Fig. 2.

My reinforcing plate may be used in place of false work, forms and molds, the reinforcing plate forming an inseparable and integral part of the permanent structure.

As will be seen by referring to the drawings a plate 5 has a plurality of columns of holes 6 and a plurality of columns of holes 7, the holes 7 being disposed between the holes 6 and at substantially equal distances from the axes of the adjacent holes 6. The plate 5 around the holes 6 is provided with teeth 8 which project from the plate and which are turned laterally substantially to the planes extending from the plate around the adjacent holes 7 and parallel with the axes of the adjacent holes 7. Projecting from the plate 5 around the holes 7 there are teeth 9, these teeth 9 projecting from the plate 5 in a direction opposite to that in which the teeth 8 project, the teeth 9 being bent laterally in the same manner as the teeth 8 and extending substantially to the planes extending from the plate 5 around the holes 6 and parallel to the axes of the said holes 6. With this construction it will be seen that the layer of cement passing through the holes 6 and 7 will be embraced at one side of the said holes 6 and 7 by the teeth 9 and at the other side of the holes 6 and 7 by the teeth 8. In this way the cement, passing through each of the holes, will be held at one side of the plate 5 by the teeth 9 and at the other side of the plate 5 by the teeth 8, in addition to which the cement will be held by the said plate.

Having thus described my invention, I claim as new and desire to secure by Letters Patent:

A reinforcing plate having a plurality of holes with teeth on the plate at the sides of the holes, the teeth at each hole extending from the plate in a direction opposite to the direction in which the teeth extend at adjacent holes, and with the terminals of the teeth at each hole bent laterally, the lateral terminals of the teeth extending substantially to planes at the sides of adjacent holes which are parallel with the axes of the last mentioned holes.

In testimony whereof I have signed my name to this specification in the presence of the two subscribing witnesses.

WILLIAM APPLEBY.

Witnesses:
 E. S. BELL,
 E. P. LOCARNINI.